United States Patent [19]

Tardif

[11] Patent Number: 5,490,622

[45] Date of Patent: Feb. 13, 1996

[54] COMMUTER MUG AND HOLDER ASSEMBLY

[75] Inventor: Pierre Tardif, Longueuil, Canada

[73] Assignee: Genin Trudeau, Quebec, Canada

[21] Appl. No.: 320,209

[22] Filed: Oct. 11, 1994

[51] Int. Cl.⁶ .............................. B60N 3/10; B65D 39/02
[52] U.S. Cl. ....................... 224/556; 296/37.13; 220/254; 220/714; 215/387; 224/926
[58] Field of Search ..................................... 224/556, 926; 296/37.13; 215/387; 220/714, 715, 254; 222/509, 518

[56] References Cited

U.S. PATENT DOCUMENTS

| | | | |
|---|---|---|---|
| 3,727,808 | 4/1973 | Fitzgerald | 220/715 |
| 4,212,408 | 7/1980 | Valenzona | 220/715 |
| 4,238,045 | 12/1980 | D'Andria | 220/714 |
| 4,345,695 | 8/1982 | Gallaway et al. | 220/714 |
| 4,361,249 | 11/1982 | Tuneski et al. | 220/714 |
| 5,222,623 | 6/1993 | Eger et al. | 220/714 |
| 5,361,950 | 11/1994 | Signal et al. | 224/926 |

*Primary Examiner*—Henry J. Recla
*Assistant Examiner*—Charles R. Eloshway
*Attorney, Agent, or Firm*—Michael Ebert

[57] ABSTRACT

A commuter mug and holder assembly connectable onto the door of an automobile to supply a hot beverage to the driver or an occupant of the vehicle in the course of travel. The mug is formed by a container for the beverage and a removable lid therefor, the lid being divided into front and rear semi-circular sections each having an arcuate wall, below which is a flexible shutter disc hinged to the rear section thereof to normally seal the container whereby when the disc is deflected it then creates an outlet for the beverage in the front section whose arcuate wall is curved toward the outlet to define a drinking spoon. Pivoted on the wall of the rear section is actuator having lugs projecting therefrom to engage the disc whereby when the actuator is depressed by a user holding the mug, the disc is deflected so that the user may then drink from the drinking spoon the beverage flowing out of the outlet. The holder includes a socket to receive the mug and a flexible strap extending from the rear of the socket and terminating in a hook. The hook is insertable into the narrow space between the door window and the door panel whereby the strap accommodates the holder to this panel regardless of its thickness, and act to maintain the socketed mug upright.

10 Claims, 3 Drawing Sheets

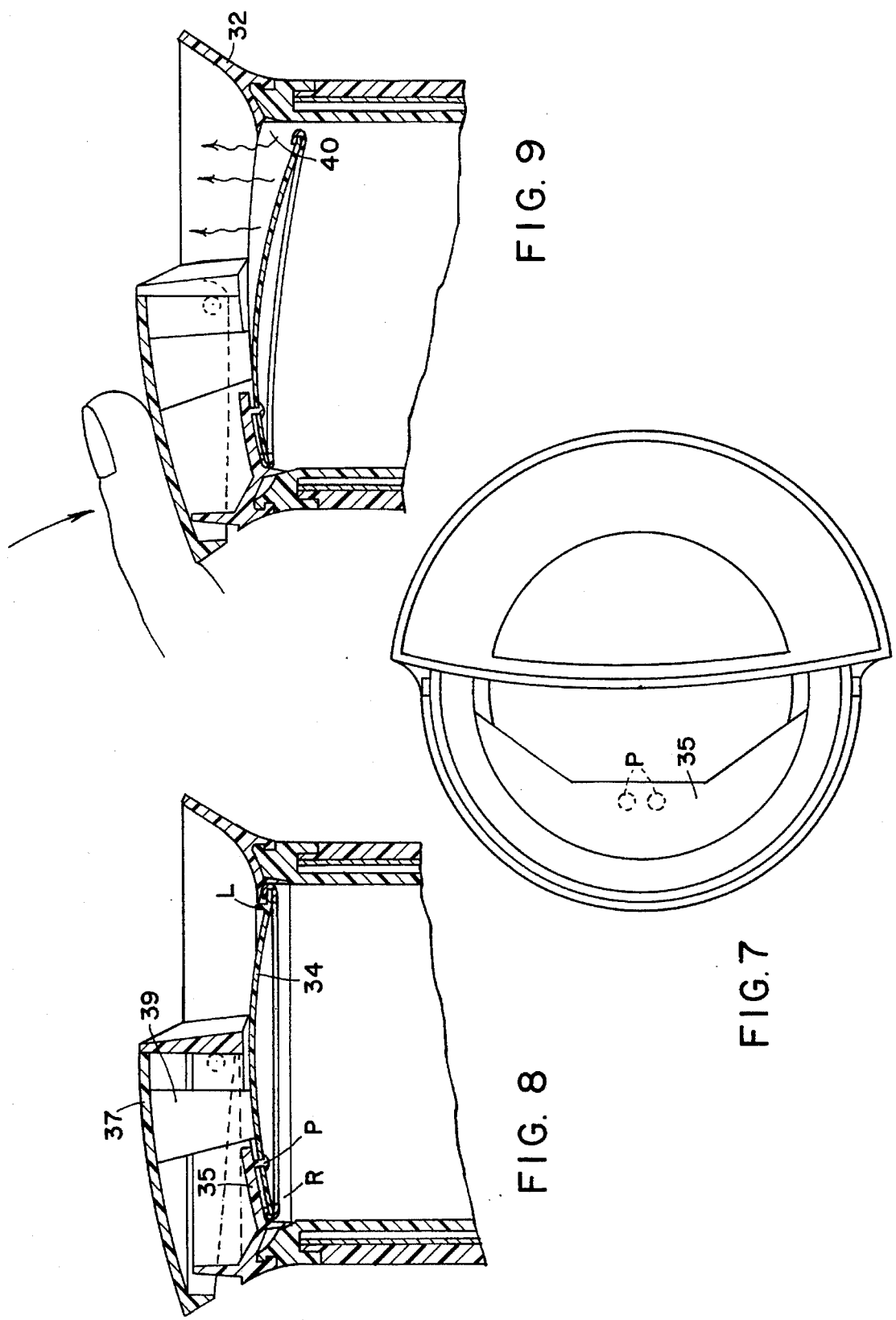

5,490,622

COMMUTER MUG AND HOLDER ASSEMBLY

BACKGROUND OF INVENTION

1. Field of Invention

This invention relates generally to a commuter mug and holder assembly adapted to be hitched onto a door of an automobile to supply the driver or an occupant of the vehicle with a hot beverage in the course of travel, and more particularly to an improved assembly which when converted from a sealing mode to a drinking mode prevents the hot beverage from shooting out of the mug as a result of vapor-pressure build-up.

2. Status of Prior Art

A commuter is a person who travels regularly from one place to another, such as from a suburb to a city. During the week, a typical commuter drives daily to work in an automobile from his suburban home to an office or workplace in the city.

Many commuters whose daily trip to work is long and tiring, take along a thermos filled with hot coffee or other stimulating hot beverage. The problem with a thermos bottle is that one cannot drink directly from this thermally-insulated container, but only from its screw-on cap which also functions as a cup. If, therefore, the driver of the vehicle, while holding the steering wheel with one hand, wishes to take a drink of coffee while driving, he cannot do so, for it takes both hands to pour coffee from a thermos into a cup. Moreover, it is difficult in a moving vehicle to drink coffee from an open cup without spilling it.

To make it possible for a commuter to conveniently transport a hot beverage container so that it is securely held in place in the vehicle driven by the commuter, yet is available to him whenever he wishes to drink, there are now commercially available so-called commuter mug and holder assemblies. The mug is usually formed of a double-walled thermally-insulated container for maintaining the beverage in a heated state, the mug being socketed in a holder having a hook that is insertable into the space between the window of the door adjacent the driver's seat and the inner section of the door panel. In this way the mug is suspended from the door and can readily be removed from its holder whenever the driver wishes to drink.

The standard mug for this purpose is provided with a removable lid having a circular wall and a small drinking outlet adjacent one side. The outlet is normally sealed by a flexible shutter mounted on the underside of the lid. The shutter is operated by a spring-biased push rod whose rear end projects through a hole in the wall opposite the outlet and terminates in a push button.

This rod has a ramp-shaped front end so that when the push button is pressed in to advance the rod, its front end then deflects the shutter to open the outlet. Thus the driver, while holding the mug in one hand, can with a finger of this hand, press in the push rod to open the outlet, and with the same hand raise the mug to his lips and drink hot coffee from the open outlet. The advantage of this small mug outlet over an open cup is that in a moving vehicle the hot coffee is confined in the mug and pours out only through the small outlet into the mouth of the driver, thereby avoiding spillage.

The user of a standard mug of this type is instructed to slowly depress the actuator button in order to relieve the vapor pressure before drinking. The reason for the warning is that the hot beverage in the sealed container gives off steam and the resultant vapor-pressure build-up is high. Hence if the small outlet were abruptly opened, the suddenly released pressure would cause the hot beverage to shoot out of the mug and possibly scald the holder of the mug and soil his clothing. By gradually opening the small outlet, the vapor pressure is progressively released and the beverage is not ejected thereby.

Hence commuter mugs of the type heretofore known, though making it possible for commuter to conveniently drink a hot beverage while driving, are somewhat hazardous unless carefully manipulated.

Another drawback of known types of commuter mug holder assemblies is that the holder which sockets the mug and is provided with a hook, does not accommodate the holder to the thickness of the inner section of the door panel onto which the assembly is hitched. When the inner section of the door panel is relatively thick and bulges out, as in some vehicles, the holder hooked thereon will cause the mug socketed in the holder to be angled with respect to the inner section of the door panel and make it difficult to remove the mug from the holder.

SUMMARY OF INVENTION

In view of the foregoing, the main object of this invention is to provide an improved commuter mug and holder assembly which is hitchable onto a door of a vehicle and makes the mug readily accessible to the driver of the vehicle.

A significant advantage of the invention is that one is able to drink a hot beverage directly from the mug without running the risk of the beverage will shoot out of the mug outlet.

More particularly, an object of this invention is to provide a commuter mug which in its drinking mode then has a relatively large outlet created by deflecting a flexible shutter disc whereby regardless of the degree of the vapor-pressure build-up in the mug during its storage mode in which the mug is sealed, when the outlet is opened, either slowly or quickly to convert the mug to its drinking mode, the vapor pressure will be immediately relieved, and not cause the beverage to shoot out.

Also an object of this invention is to provide an assembly which when the holder for the mug is hitched onto an automobile door, it will cause the mug to assume an upright position regardless of the thickness of the inner section of the door panel.

Yet another object of the invention is to provide a low cost assembly which is easy to handle and which may be quickly installed on an automobile door.

Briefly stated, these objects are attained by a commuter mug and holder assembly hitchable onto the door of an automobile to supply a hot beverage to the driver or an occupant of the vehicle in the course of travel. The mug is formed by a container for the beverage and a removable lid therefor, the lid being divided into front and rear semi-circular sections each having an arcuate wall, below which is a flexible shutter disc hinged to the rear section thereof to normally seal the container whereby when the disc is deflected it then creates a large outlet for the beverage in the front section whose arcuate wall is curved toward the outlet to define a drinking spoon.

Pivoted on the wall of the rear section is an actuator having lugs projecting therefrom to engage the disc whereby when the actuator is depressed by a user holding the mug, the disc is deflected so that the user may then drink from the drinking spoon the beverage flowing out of the outlet. The holder includes a socket to receive the mug and a flexible strap extending from the rear of the socket and terminating in a hook. The hook is insertable into the narrow space between the door window and the door panel whereby the strap accommodates the holder to this panel regardless of its thickness and act to maintain the socketed mug upright.

BRIEF DESCRIPTION OF DRAWINGS

For a better understanding of the invention as well as other objects and further features thereof, reference is made to the following detailed description to be read in conjunction with the accompanying drawings, wherein:

FIG. 7 is a top view of the lid with its actuator removed;

FIG. 8 is a section taken through the lid in the sealing mode of the mug, and;

FIG. 9 is a section taken through the lid in its drinking mode.

DESCRIPTION OF INVENTION

Figure 1:
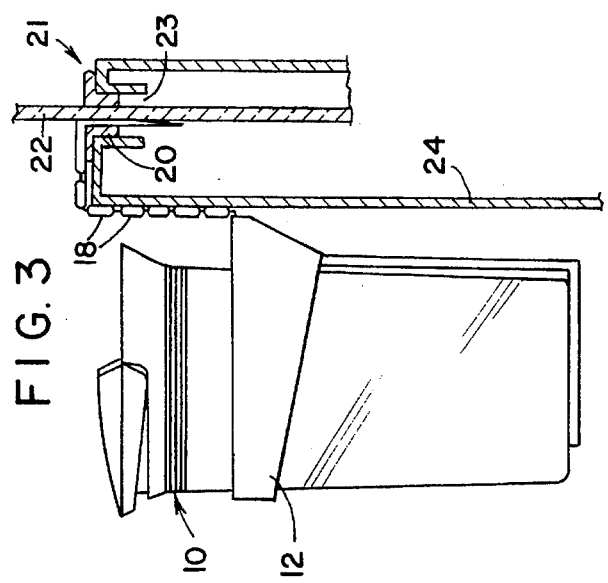
FIG. 1 is a perspective view of a commuter mug and holder assembly according to the invention.
Figure 2:
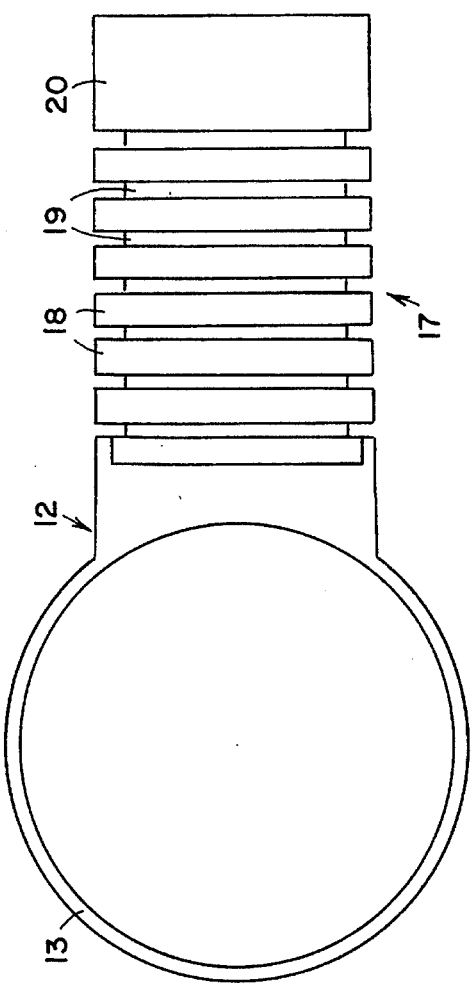
FIG. 2 is a top view of the holder.

Referring now to FIGS. 1 and 2, there is shown a commuter mug and holder assembly in accordance with the invention whose main components are: a cylindrical mug 10, a removable lid 11 therefor, and a holder 12 for supporting the mug in an upright position on the door to which it is hitched.

Holder 12 which is molded or otherwise fabricated of synthetic plastic material such as polypropylene, polyethylene or other high strength plastic, includes an upper collar which is dimensioned to receive and socket mug 10, and a lower step 15 on which the mug sits. Collar 13 and step 15 project laterally from a back plate 14 having a concave cross section to conform to the cylindrical mug inserted in the collar and resting on the step. (In FIG. 2, step 15 is omitted.)

Extending from a bracket 16 behind collar 13 is a strap 17 formed by a series of parallel slats 18 interconnected by living hinges 19 and terminating in a right-angle hook 20 whose tongue is wedge-shaped.

Figure 3:
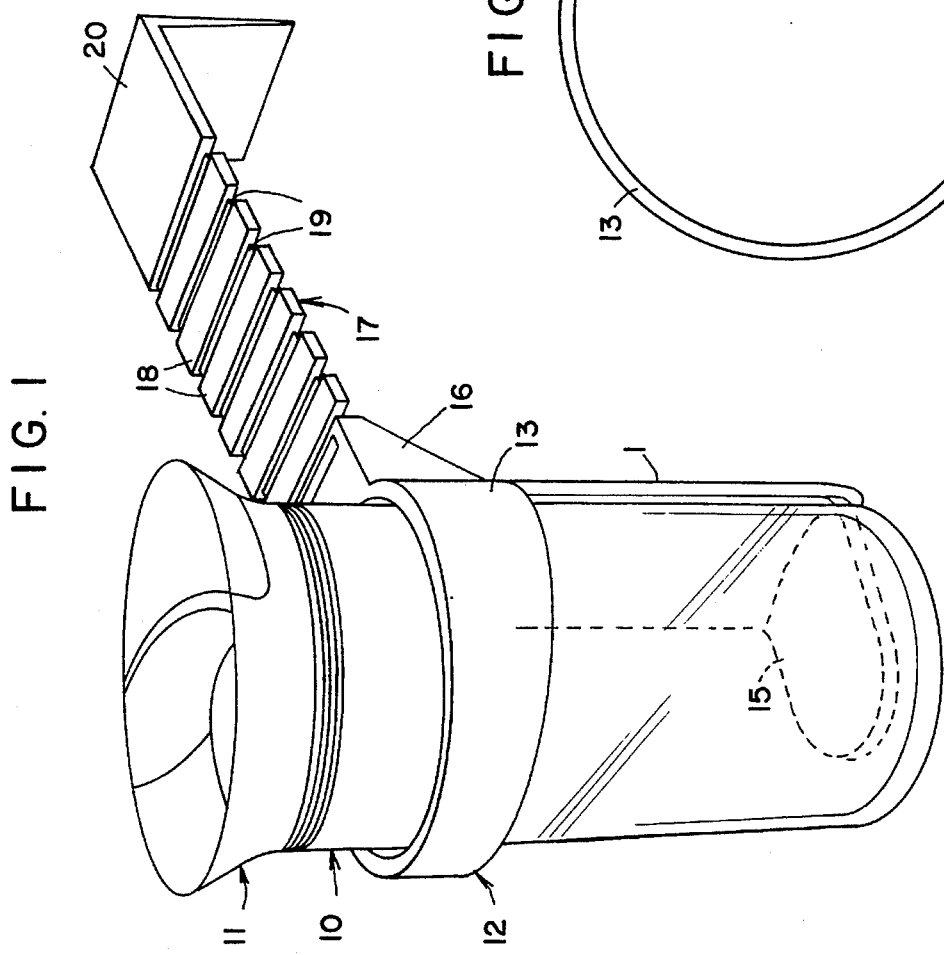
FIG. 3 is a side view of the assembly, as it appears when hitched onto the door of an automobile.

The assembly as shown in FIG. 3, is hitched onto the door 21 of a vehicle, such as the door adjacent the driver's seat. Door 21 is provided with a window 22 that is retractable into a slot 23 between the inner section 24 of the door panel and its outer section. Hook 20 is inserted into the narrow space between window 22 and inner panel section 24. The thickness of inner panel section 24 depends on the door design which is not the same for all automobile models, the inner panel section being thicker in some models than in others.

But strap 17 will always accommodate itself to the thickness of the inner section of the door panel, for if this section is relatively thick, more of the strap slats 18 will overlie the upper edge of the inner section than if the inner section were thin. But in either case, the remaining slats of the strap will lie against the vertical surface of the inner section of the door panel and the holder will maintain the mug 10 supported thereby in an upright position so that it is available for use.

Figure 4:
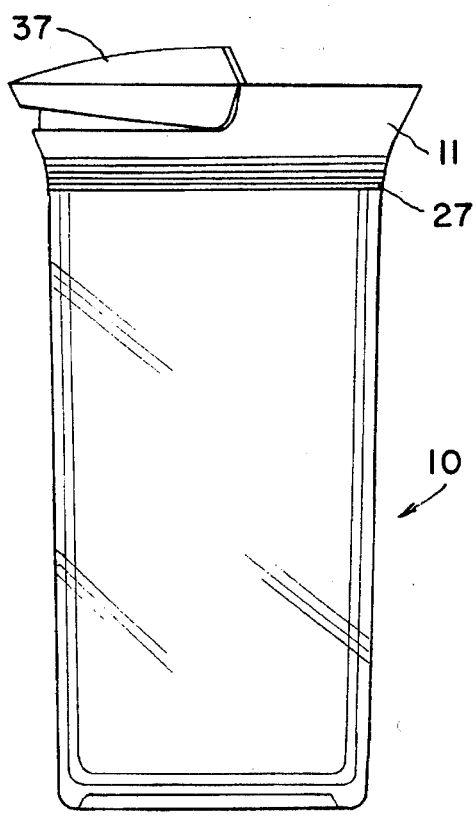
FIG. 4 is an elevational view of the mug.
Figure 6:
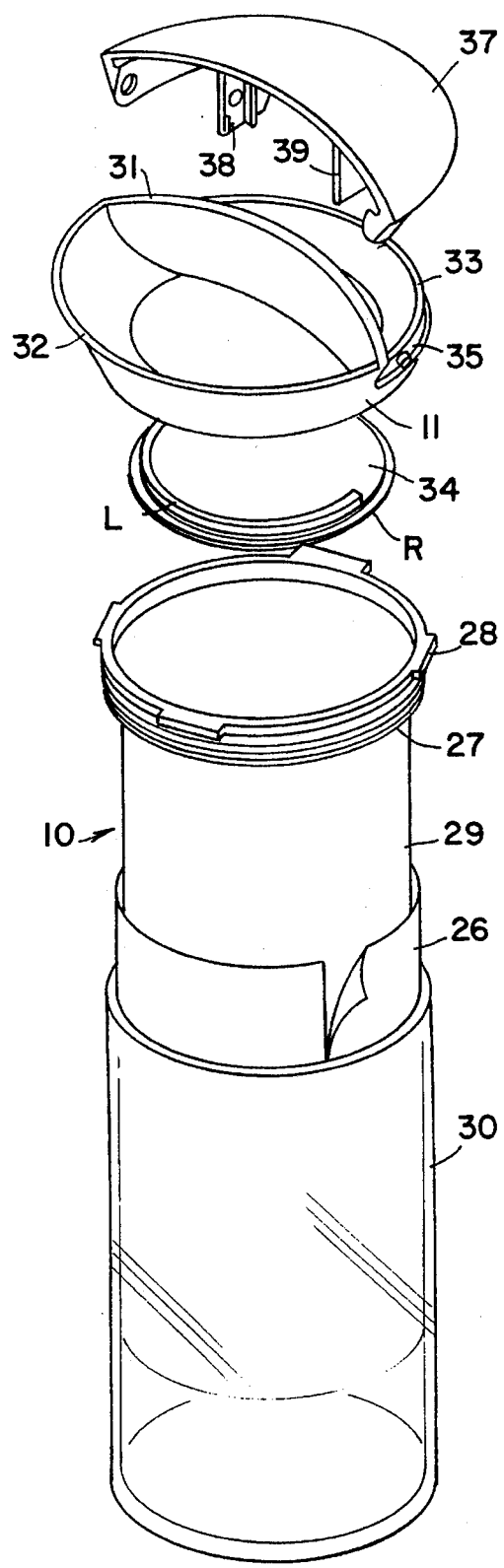
FIG. 6 is an exploded view of the mug.
Figure 5:
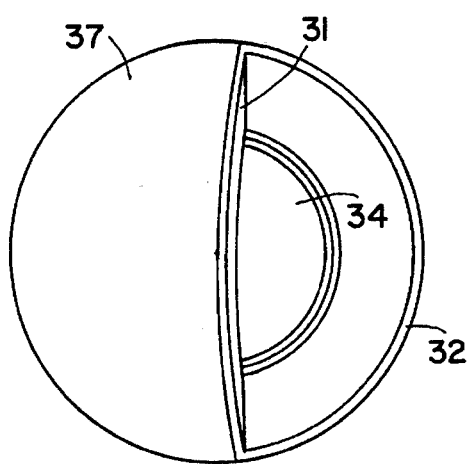
FIG. 5 is a top view of the mug.

Commuter mug 10 which is fabricated of synthetic plastic material such as polyethylene or other plastic suitable for containing a hot beverage, is provided as best seen in FIGS. 4 to 6 with a corrugated rim 27 which permits a user to get a good grip on the mug. Above rim 27 is an annular bayonet coupler 28 to receive a complementary coupler on the removable lid 11 so that one is able with a twist motion to couple or decouple the lid.

As shown in FIG. 6, mug 10 is of double-walled construction to provide thermal insulation. The mug is formed by concentric cylindrical walls 29 and 30, the space therebetween being filled with an insulating sheet 26 or with a foam plastic or other thermal insulation core material.

Lid 11, as best seen in FIGS. 6 and 7, is divided by a partition 31 into a semi-circular open front section having an arcuate wall 32, and a semi-circular rear section, having an arcuate wall 33. Underlying these sections, as best seen in FIG. 8, is a dome-shaped shutter disc 34 formed of flexible plastic material. Disc 34 is surrounded by a sealing ring R of elastomeric material. An arcuate flow control ledge L is formed on the upper surface of the disc in the portion thereof underlying the front section of the lid. Disc 34, at one end to the bottom wall 35 of the rear of the end section is attached thereto by rivets P so that it is hinged from the lid. Hence when disc 34 is downwardly deflected, it then creates a large outlet in the front section of the lid.

Pivoted on the wall 32 of the rear section by means of pivot pins 36 adjacent partition 31 is an actuator 37 (see FIGS. 6 and 8). Actuator 37 has a half-moon shape and an arcuate side wall that conforms to the curvature of lid sidewall 33. The actuator has received to its underside a pair of projecting lugs 38 and 39 which engage the portion of the shutter disc 34 underlying the rear section of the lid.

When, therefore, actuator 37 is pressed down by a user as shown in FIG. 9, the shutter disc 34 is then flexed downwardly by lugs 38 and 39 to create an outlet 40 at the front section of the lid. The arcuate wall 32 of this front section, as shown in FIGS. 1 and 6 curves toward the disc underlying this section to define a drinking spoon for the beverage flowing out of the outlet created when the disc is deflected.

When, as shown in FIG. 8, the shutter disc seals the container, the mug is then in its storage mode, and when the disc is deflected by the actuator to create an outlet, the mug, as shown in FIG. 9, is then in its drinking mode.

Thus the driver when he wishes to drink, simply lifts the mug out of its holder with one hand while his other hand engages the steering wheel, and with a finger of the hand holding the mug, he presses actuator 37 down to create the outlet to put the mug in its drinking mode. The outlet so created is not a small hole but is a relatively large arcuate slot in the front section of the lid. If, therefore, during the storage mode there has been a vapor-pressure build-up in the mug containing the hot beverage, when the outlet is created, this acts to release the pressure over a relatively large area, rather than through a small hole, as in prior commuter mugs. Hence whether the outlet is slowly or quickly created, in either case, the released vapor pressure does not cause the beverage to shoot thereout.

While there has been shown a preferred embodiment of the invention, it will be appreciated that modifications may be made therein without departing from the essential features of the invention.

I claim:

1. A commuter mug and holder assembly connectable to a door of an automobile having a window retractable into a slot in a door panel having an inner section, the mug being adapted to supply an occupant or driver of the vehicle with a hot beverage; said assembly comprising:

A. a mug formed by a cylindrical container for the hot beverage;

B. a removable lid for the container, said lid being divided into a semi-circular open front section having an arcuate front wall and a semi-circular rear section having an arcuate rear wall and a base, a flexible shutter disc connected at an underside of the lid to seal the container, said disc being hinged to the base of the rear section and being deflectable to create an outlet for the beverage in the front section; and an actuator pivoted on the arcuate wall of the rear section which when depressed by a user of the mug, then acts to deflect the disc to create said outlet in the front section whereby the user may then drink the beverage from the outlet; and C. a holder adapted to hold the mug and provided with a hook that is insertable in a space between the window and the inner section of the door panel to support the mug in an upright position adjacent the door.

2. An assembly as set forth in claim 1, in which the container is a double-walled thermally-insulated container.

3. An assembly as set forth in claim 2, in which the container is provided with a corrugated rim below the lid to afford a good gripping surface.

4. An assembly as set forth in claim 1, in which the front wall of the front section is curved toward the disc underlying this section to define a drinking spoon.

5. An assembly as set forth in claim 1, in which the actuator has a half-moon shape and a side wall that conforms to the arcuate rear wall of the rear section.

6. An assembly as set forth in claim 1, in which the actuator is provided at its underside with at least one projecting lug that engages the disc.

7. An assembly as set forth in claim 1, in which the holder is provided with a back plate having a collar projecting laterally from an upper end to receive the container and a step projecting from a lower end on which the container is seated.

8. An assembly as set forth in claim 7, in which the holder is provided with a strap that extends rearwardly from the upper end of the plate and terminates in a hook that is inserted in said space.

9. An assembly as set forth in claim 8, in which the strap is formed of a series of plastic slats interconnected by living hinges.

10. A commuter mug comprising:

A. a mug formed by a cylindrical container for a hot beverage; and

B. a removable lid for the container, said lid being divided into a semi-circular open front section having an arcuate front wall and a semi-circular rear section having an arcuate rear wall and a base, a flexible shutter disc connected at an underside of the lid to seal the container, said disc being hinged to the base of the rear section and being deflectable to create an outlet for the beverage in the front section; and an actuator pivoted on the arcuate wall of the rear section which when depressed by a user of the mug, then acts to deflect the disc to create an outlet in the front section whereby the user may then drink the beverage from the outlet.

* * * * *